UNITED STATES PATENT OFFICE.

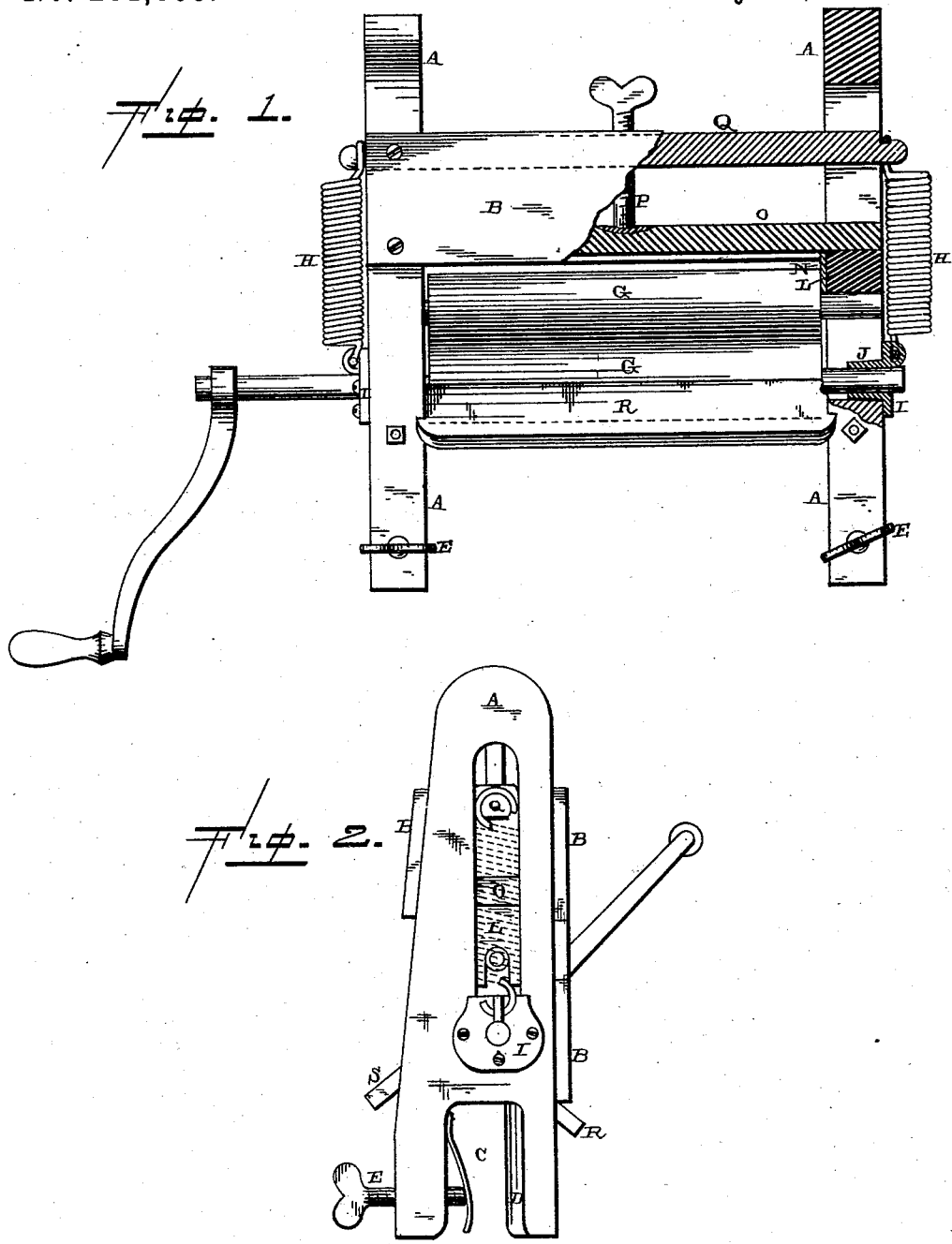

ORANGE P. GOULD, OF ELMIRA, NEW YORK.

CLOTHES-WRINGER.

SPECIFICATION forming part of Letters Patent No. 281,866, dated July 24, 1883.

Application filed March 5, 1883. (No model.)

*To all whom it may concern:*

Be it known that I, ORANGE P. GOULD, of Elmira, in the county of Chemung and State of New York, have invented certain new and useful Improvements in Clothes-Wringers; and I do hereby declare the following to be a full, clear, and exact description of the invention, such as will enable others skilled in the art to which it pertains to make and use it, reference being had to the accompanying drawings, which form part of this specification.

My invention relates to an improved wringing-machine; and it consists in the combination and arrangement of parts, which will be more fully described hereinafter, whereby a cheap, simple, and effective wringer is produced.

Figure 1 is a side elevation of my invention, partly in section. Fig. 2 is an end view of the same.

A represents the two end pieces of the wringer-frame, which are rigidly secured together by the three cross-pieces B, two of which are placed upon one side and one upon the other. The lower end of each one of the end pieces has a suitable recess, C, made in it, so as to pass down over the edge of the tub or other support, and one of the outer edges of each of the recesses is beveled away, as shown at D, so as to correspond to the circular form of the tub, and thus allow the frame to sink down over the edge of the tub more freely.

Passed through from one side of each standard is the clamping-screw E, by means of which the frame is rigidly secured to any suitable support.

Instead of having the two rollers G pressed together by means of a set-screw at each end of the frame, in the usual manner, they are here drawn together by the tension of the springs H, which will be of a size and strength proportioned to the size of the wringer for the kind of work that is to be done. The lower roller of the wringer is journaled in the two boxes I, which are rigidly secured to the outer sides of the end pieces of the frame by screws or other fastening devices, and which boxes have the tubular extensions or sleeves J, projecting inward, so as to form bearings for the roller. These boxes serve to hold the roller in position and as means for attachment for the lower ends of the springs. Each one of the boxes has a perforated ear or projection extending outward from it, and into this ear or projection is hooked the lower end of the spring. The lower roller has no other movement than a revolving one, while the upper roller has both a vertical and a revolving movement. The upper roller is held down in position upon the lower one by suitable boxes, L, which are placed in the slots made in the ends of the frame, and these boxes are held in position by means of simple plates N, which are attached to their inner sides, and which plates catch against the ends of the frame, and thus prevent the boxes from becoming displaced outward, while the ends of the rollers prevent them moving inward. Secured upon the top of these two upper boxes is the lower spring-bar, O, against the top of which the pressure of the thumb-screw P is made to bear. This thumb-screw passes through the upper spring-bar, Q, which is made sufficiently long to have its ends project through the slots in the end pieces and have the upper ends of the springs catch over them. When the thumb-screw is forced downward, the spring is raised upward at the same time that the upper rollers are forced downward and the tension upon the springs increased. When large or thick pieces of clothing are pressed in between the rollers, the upper roller will rise upward and adjust itself to the required thickness. By thus having the spring to regulate the pressure of the upper roller upon the lower one the cog-wheels and other similar devices which are generally used are entirely done away with, and the upper roller is caused to revolve from frictional contact alone.

Underneath the rollers is placed the drip-board R, which has its ends inserted in diagonal grooves which are made in the inner sides of the end pieces, and when the screws or other fastening devices which hold the lower one of the three side pieces in place are forced inward they can, if so desired, be made to bear against the edge of the drip-board, so as to lock it rigidly in place. By thus recessing the ends of the drip-board the frame is secured more rigidly and firmly together. Upon the opposite side of the rollers, where the clothes come out, is placed a suitable guide-board, S, which also has its ends inserted in suitable grooves made in the inner sides of the frame.

By means of the construction above described the rollers can be forced two inches apart, or any lesser distance, thereby causing a direct pull upon the springs, which causes the rollers to adjust themselves to any article that is being wrung out. The pressure is so arranged that all uneven places will pass through without injury to the wringer or detriment to the fabric, and the labor of turning the rollers is made much less than where cogs and other things of that kind are required.

Having thus described my invention, I claim—

In a wringing-machine, the combination, with the supporting-frame, of the lower roller, G, the boxes I, provided with the tubular portions J, and suitable eyes into which the lower ends of the springs H are made to catch, the said boxes being secured rigidly to the supporting-frame, with the upper roller G, provided with a movable box, L, the bars O Q, the springs H, and the set-screw P, substantially as shown and described.

In testimony whereof I affix my signature in presence of two witnesses.

ORANGE P. GOULD.

Witnesses:
J. E. HALLECK,
J. A. OPP.